(12) United States Patent
Yamashiro (10) Patent No.: US 11,483,250 B2
(45) Date of Patent: Oct. 25, 2022

(54) SYSTEM AND METHOD FOR PROCESSING MESSAGES SENT USING DIFFERENT TRANSMISSION PROTOCOLS

(71) Applicants: Denso International America, Inc., Southfield, MI (US); DENSO CORPORATION, Kariya (JP)

(72) Inventor: Takahisa Yamashiro, West Bloomfield Township, MI (US)

(73) Assignees: DENSO CORPORATION, Aichi (JP); Denso International America, Inc., Southfield, MI (US)

(*) Notice: Subject to any disclaimer, the term of this patent is extended or adjusted under 35 U.S.C. 154(b) by 239 days.

(21) Appl. No.: 16/832,204

(22) Filed: Mar. 27, 2020

(65) Prior Publication Data

US 2021/0306277 A1    Sep. 30, 2021

(51) Int. Cl.
*H04L 47/32* (2022.01)
*H04W 4/40* (2018.01)

(52) U.S. Cl.
CPC .............. *H04L 47/32* (2013.01); *H04W 4/40* (2018.02)

(58) Field of Classification Search
CPC .................................. H04L 47/32; H04W 4/40
See application file for complete search history.

(56) References Cited

U.S. PATENT DOCUMENTS

| 10,193,854 B2 | 1/2019 | Weinfield | |
| 2011/0227757 A1* | 9/2011 | Chen | G08G 1/0104 340/902 |
| 2012/0008535 A1* | 1/2012 | Kuehnel | H04W 88/10 370/331 |
| 2014/0133656 A1 | 5/2014 | Wurster et al. | |
| 2016/0315900 A1* | 10/2016 | Rowny | H04L 69/14 |
| 2018/0205699 A1* | 7/2018 | Weinfield | H04L 43/0823 |

(Continued)

FOREIGN PATENT DOCUMENTS

| WO | 2018182591 A1 | 10/2018 |
| WO | 2018182592 A1 | 10/2018 |

OTHER PUBLICATIONS

Marojevic, "C-V2X Security Requirements and Procedures: Survey and Research Directions," 6 pages, 2018, arXiv:1807.09338.

(Continued)

*Primary Examiner* — Brian P Cox
(74) *Attorney, Agent, or Firm* — Christopher G. Darrow; Darrow Mustafa PC (57) ABSTRACT

A system and related method for processing messages may include one or more processors and a memory in communication with the one or more processors. The memory may include a communications module, a deduplication module, and a message processing module. The communications module may cause the one or more processors to send or receive a first message via a first transmission protocol having a first temporary identifier value and a second message via a second transmission protocol having a second temporary identifier value. The deduplication module may cause the one or more processors to determine if the first temporary identifier value is related to the second temporary identifier value. In the event, the identifier values are related, the second message is discarded. Thereafter, the message processing module may cause the one or more processors to process the first message.

17 Claims, 7 Drawing Sheets

(56) References Cited

U.S. PATENT DOCUMENTS

2019/0380014 A1    12/2019  Onishi
2020/0059821 A1*    2/2020  Wirth ................... H04W 28/04
2020/0178331 A1*    6/2020  Xu ....................... H04W 76/16

OTHER PUBLICATIONS

Singh et al., "CPESP: Cooperative Pseudonym Exchange and Scheme Permutation to preserve location privacy in VANETs," Vehicular Communications, vol. 20, 100183, 2019 (Abstract, 3 pages).

* cited by examiner

SYSTEM AND METHOD FOR PROCESSING MESSAGES SENT USING DIFFERENT TRANSMISSION PROTOCOLS

TECHNICAL FIELD

The subject matter described herein relates, in general, to systems and methods for processing messages sent using different transmission protocols.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles can exchange information with other devices, such as other vehicles, infrastructure, mobile devices, and the like. Several different wireless communication protocols have been proposed that allow the exchange of information between these different entities. Some of these different communication protocols include Dedicated Short-Range Communication (DSRC), Cellular vehicle-to-everything (C-V2X), Wi-Fi, Bluetooth, etc.

In some situations, different entities that are communicating information between each other may transmit the same information, referred to as a message, using different communication protocols. Therefore, in one example, a vehicle may transmit a message to another vehicle utilizing both C-V2X and DSRC communication protocols. As such, the vehicle sending the message essentially transmits two messages. The first message is the message being sent using a C-V2X protocol, while the second message is the same but is sent via DSRC. The vehicle receiving these messages may, after receiving these messages, process both these messages that contain essentially the same information. This duplication of processing the same message is computationally wasteful, as the same message was essentially processed twice.

SUMMARY

This section generally summarizes the disclosure and is not a comprehensive explanation of its full scope or all its features.

In one embodiment, a system for processing messages may include one or more processors and a memory in communication with the one or more processors. The memory may include a communications module, a deduplication module, and a message processing module. The communications module may cause the one or more processors to send or receive a first message via a first transmission protocol having a first temporary identifier value and a second message via a second transmission protocol having a second temporary identifier value. The deduplication module may cause the one or more processors to determine if the first temporary identifier value is related to the second temporary identifier value. If the identifier values are related, the second message is discarded. It should be understood that "first" and "second" may be relative terms. In some cases the first message may be received before the second message or vice versa. Thereafter, the message processing module may cause the one or more processors to process the first message.

The memory may also include an identifier generating module having instructions that, when executed by the one or more processors, cause the one or more processors to generate a random identifier value. The communications module may cause the one or more processors to transmit a first outgoing message via the first transmission protocol having a first outgoing temporary identifier value and the second transmission protocol having a second outgoing temporary identifier value. The first and the second outgoing temporary identifier values are based on the random identifier value.

In another embodiment, a method for transmitting messages may include the steps of generating a random identifier value, transmitting a first message via a first transmission protocol having a first temporary identifier value that is based on the random identifier value, and transmitting a second message via a second transmission protocol having a second temporary identifier value that is based on the random identifier value.

In another embodiment, a method for receiving messages may include the steps of receiving a first message via a first transmission protocol having a first temporary identifier value, receiving a second message via a second transmission protocol having a second temporary identifier value, comparing the first and second temporary identifier values to determine if they are related, discarding the second message when the first temporary identifier value is related to the second temporary identifier value, and processing the first message.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A system and method for sending and/or receiving messages as well as processing messages may include one or more processors that are in communication with a memory device that stores several modules that configure the processor for transmitting and/or receiving as well as processing messages. In one implementation, the system can transmit messages via one or more communication protocols. These communication protocols could include DSRC, C-V2X, Wi-Fi, and Bluetooth.

Before sending a message via different communication protocols, the system first generates a random identifier. The random identifier will be used to provide a temporary identifier to the message sent via different communication protocols. As such, when a message is sent using more than one protocol, a message for each communication protocol must first be generated. If the system is sending a message via DSRC and C-V2X, two separate messages containing the same information are generated.

Brief mention should be made regarding two or more messages that are the "same message" and/or contain the "same information" and/or "same data." As it is generally known, messages sent using different protocols may have different preambles, post ambles, headers, footers, or other information, such as identifiers, that may vary based on the time the message was sent, the origin of the message, the destination of the message, the type of protocol being used to send the message, etc. These portions of the messages allow for the delivery of the "payload portion" of the message. The payload portion of the message is the part of the transmitted or received message that is the actual intended message. When this specification refers to messages that are the same message and/or contain the same information and/or same data, this may mean that the payload, or the intended message, is the "same," but other portions of the message, such as the preamble, postamble, header, footer, or other portions of the message that allow for the transmission or reception of the payload may change.

Further, with regards to the payload, the intended information expressed in the payload may be represented digitally in a different way, but ultimately conveys the same intended message. For example, the size of the message (number of bits utilized) and/or the byte order of the payload may differ (e.g., big-endian vs. small endian) from one type of message to the other, but ultimately convey the same intended message.

The random identifier acts as a form of temporary identifier for the two separate messages that contain the same information. In this case, before sending the two separate messages, the system adds the temporary identifier to the two separate messages. The purpose of adding the temporary identifier to the two separate messages is so that a receiving entity, after receiving two messages that contain the same information, can determine that the two messages are essentially duplicates (i.e., have the same payloads and/or convey the same intended message) and can discard one of the messages by comparing the temporary identifiers of the two messages.

The temporary identifiers of the two messages may not necessarily match the random identifier but are generally based on the random identifier in one form or another. As such, the temporary identifiers of the two messages may include a portion, all, or some mathematical relationship to the random identifier. As such, the receiving unit can determine that the two messages sent by different communication protocols are the same message and can discard one of the messages and not waste computational resources on the duplicate message.

As such, the system from the receiving side may include a receiver that is able to determine the temporary identifiers of messages received via different communication protocols. The system can compare the temporary identifiers to see if there is a relationship between the temporary identifiers of messages. If there is a relationship between the temporary identifiers, the system can discard one of the messages and process the other message. Again, by so doing, computational resources are not wasted in processing the duplicate message.

Figure 1:
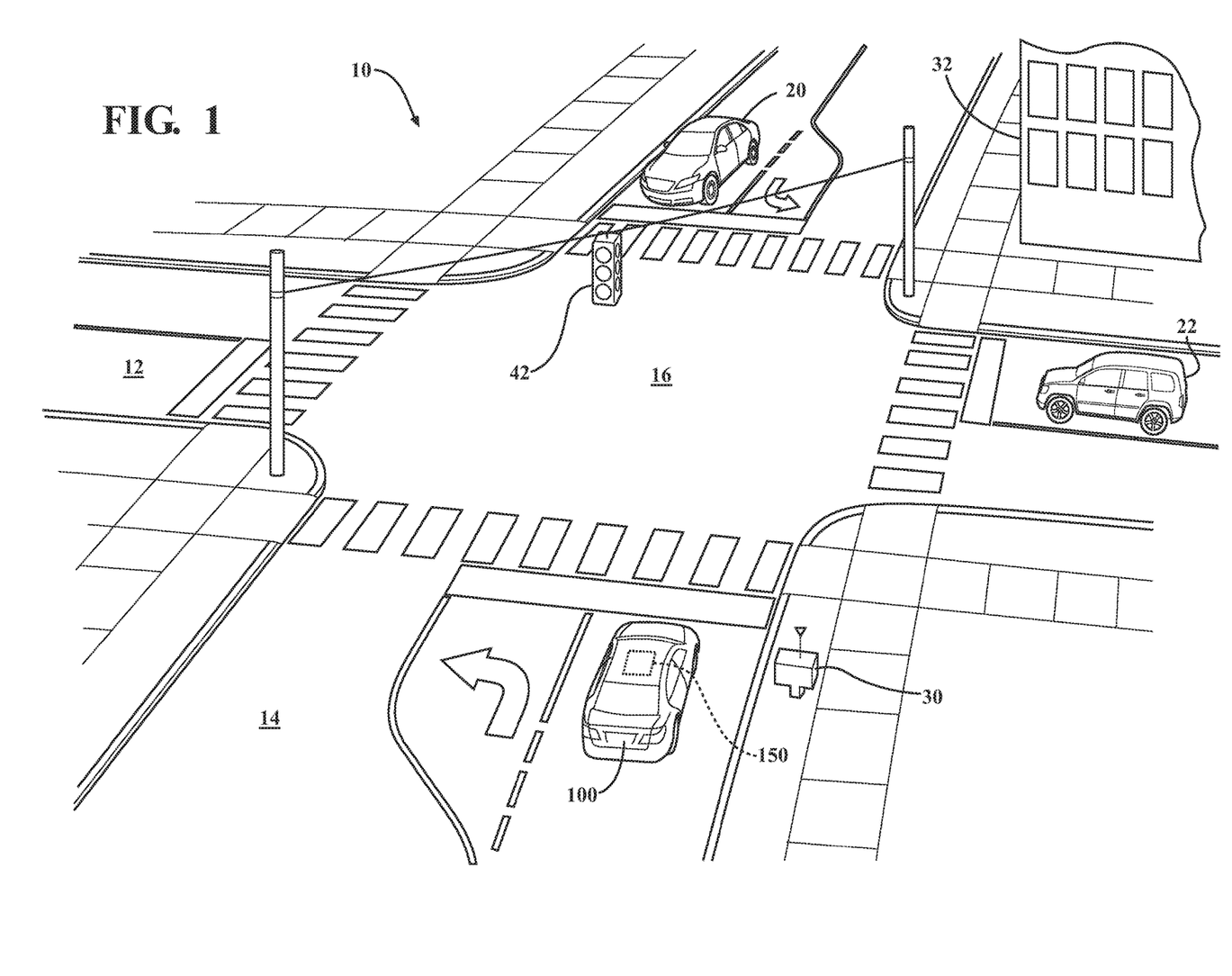
FIG. 1 illustrates a scenario of an environment in which different entities are communicating with each other using different communication protocols.

In order to better explain the system for processing messages, reference is made to FIG. 1 that illustrates a scenario 10 that includes a vehicle 100 that includes a message processing system 150. The scenario 10 is just one example of how the message processing system 150 may be utilized. The message processing system 150 is not limited to the scenario 10 and can be used in any one of several different scenarios. Furthermore, while the scenario 10 illustrates the message processing system 150 incorporated within a vehicle 100, it should be understood that the message processing system 150 could be incorporated in any one of a number of devices, such as other vehicles, infrastructure, roadside units, mobile devices, and the like.

Here, the vehicle 100 is located on a road 14 that intersects another road 12 at the intersection 16. The intersection 16 includes a traffic light 42 that can provide instructions to vehicles, pedestrians, and the like for safely interacting with the intersection 16. As such, the scenario 10 also includes other vehicles, such as vehicle 20 that is proceeding down the road 14 towards the intersection 16, as well as another vehicle 22 proceeding down the road 12 towards the intersection 16.

For illustrative purposes, the scenario 10 also includes several infrastructure components as well. For example, the scenario 10 includes a traffic light 42 that is able to direct traffic through one or more lights and/or by sending messages wirelessly to vehicles, such as the vehicle 100, 20, and/or 22 using any of the communication protocols mentioned in the specification. Other forms of infrastructure may be present, as well. For example, the scenario 10 also includes a building 32, which may be a parking structure. The parking structure may have the ability to send messages wirelessly to other entities to inform them regarding one or more features of the building 32, such as the availability of parking spaces, operating hours, etc.

The scenario 10 may also include a roadside unit 30. In one example, the roadside unit 30 may act as a communication device that is capable of communicating with other devices and infrastructure, such as the vehicles 20, 22 and/or 100, the traffic light 42, the building 32, and the like. The roadside unit 30 may provide additional connectivity and or processing services for any device that connects to the roadside unit 30.

Again, it should be stressed that the elements making up the scenario 10 are merely for explanatory purposes, and the scenario 10 can vary significantly. For example, the scenario 10 may include more or fewer infrastructure components, more or fewer vehicles, more or fewer roadside units, etc.

In this example, the vehicles 20, 22, and 100, the traffic light 42, the roadside unit 30, and the building 32 each can communicate with each other using messages. As such, each of these entities may include a variation of the message processing system 150 that will be described later in this specification. Each of these entities may utilize a single communication protocol or may use multiple communication protocols. Furthermore, each of these entities may transmit the same message multiple times via each communication protocol.

Figure 2:
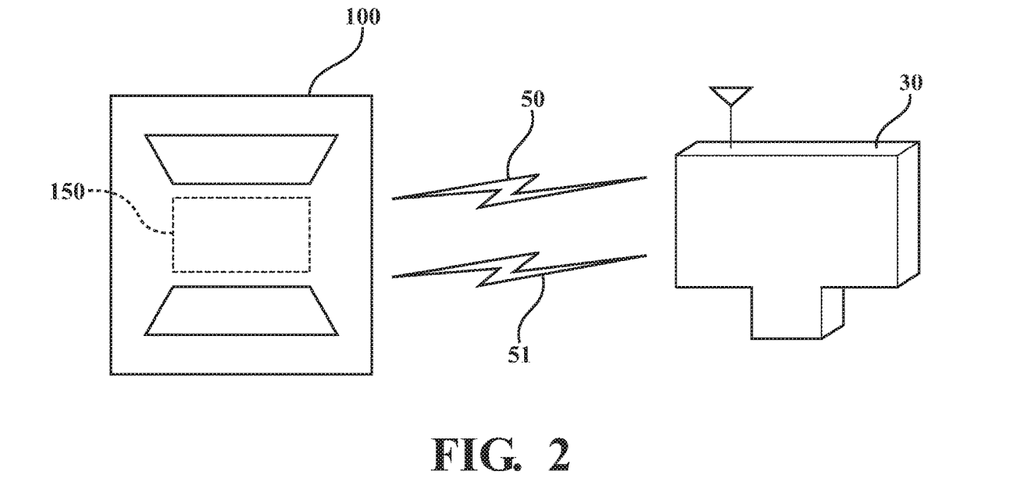
FIG. 2 illustrates a scenario where a vehicle having a system for processing messages communicates with a roadside unit.

For example, referring to FIG. 2, the vehicle 100 incorporating the message processing system 150 is shown communicating with the roadside unit 30. Again, it should be understood that this is just but one example and that any of the entities, such as the vehicles 20, 22, and/or 100, the traffic light 42, the roadside unit 30, and/or the building 32 could be utilized in this example. Here, the vehicle 100 can communicate using two or more communication protocols. As stated before, these communication protocols could include DSRC, C-V2X, Wi-Fi, and/or Bluetooth. However, these communication protocols are not necessarily limited to those listed above and can include any one of a variety of different communication protocols.

In this example, the vehicle 100 is transmitting the same message twice using two different communication protocols. The first message 50 is transmitted by one communication protocol (e.g., DSRC), while the second message 51 is transmitted by another communication protocol (e.g., C-V2X). The first message 50 and the second message 51 essentially contain the same information (i.e., message payload and/or intended message) but are sent via the two different protocols.

The roadside unit 30, in this example, can receive messages using both communication protocols. As such, the roadside unit 30 will be able to receive and process both the first message 50 and the second message 51. Normally, the roadside unit 30 does not assume that the messages are the same and will process both messages, wasting valuable computational resources. However, as will be described later in this disclosure, the system 150 has the ability to embed a temporary identifier into the messages 50 and 51 so as to indicate to a receiving unit, such as the roadside unit 30, that the messages 50 and 51 essentially contain the same information and therefore do not need to be both processed, as one message is essentially a duplicate of another message.

Figure 3:
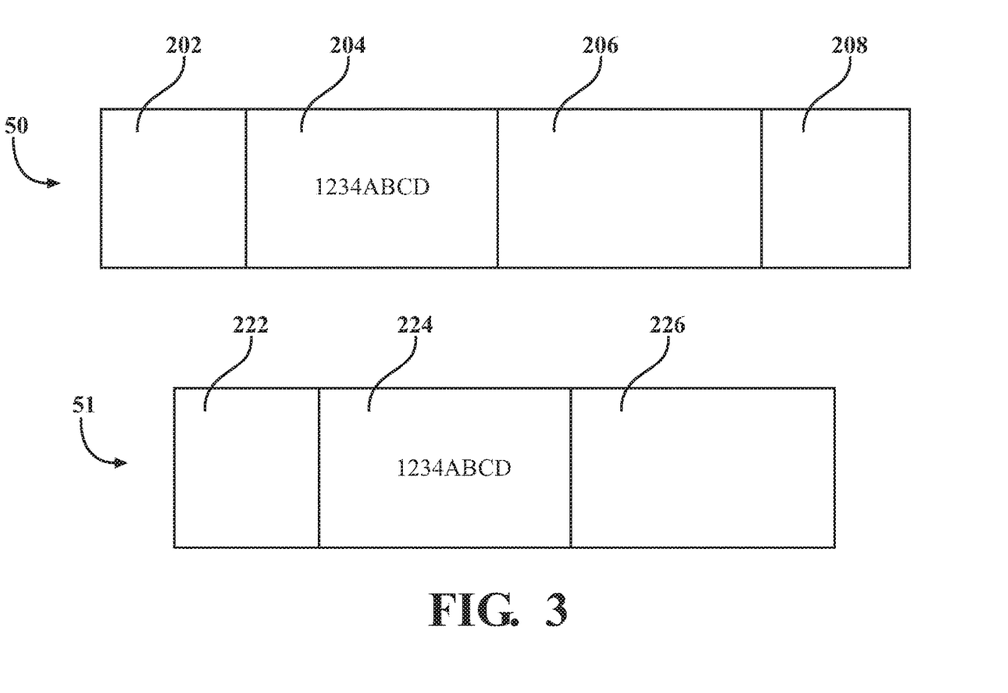
FIGS. 3-5 illustrates different examples of the same message being transferred by two different communication protocols.

Regarding FIG. 3, examples of messages 50 and 51 are shown. Here, the messages 50 and 51 include a payload portion 206 and 226, respectively, that essentially contain the same information. This information may be encoded differently, but essentially communicates the same underlying message. The messages 50 and 51 because they are transmitted by different communication protocols, may also have some other differences as well, such as requirements made by each communication protocol. For example, the messages 50 and 51 both have preambles 202 and 222, respectively. In one example, the first message 50 may include a postamble 208, while the second message 51 does not contain a postamble. Either way, the payload portion 206 and 226 may be somewhat similar and essentially contain the same intended message. In one example, the two messages 50 and 51 can include slightly different payload information. For example, the longitude and latitude data can be slightly different because the position can be extrapolated to the latest estimated position from old position, speed and heading, before transmitted.

The messages 50 and 51 also include temporary identifiers 204 and 224, respectively. The temporary identifiers 204 and 224 are generated by the message processing system 150 using a random number generator. In this example, the temporary identifiers 204 and 224 are identical.

As such, the roadside unit 30 after receiving the messages 50 and 51 can determine that the temporary identifiers 204 and 224 are related and therefore discard one of the messages and process the other.

Figure 4:
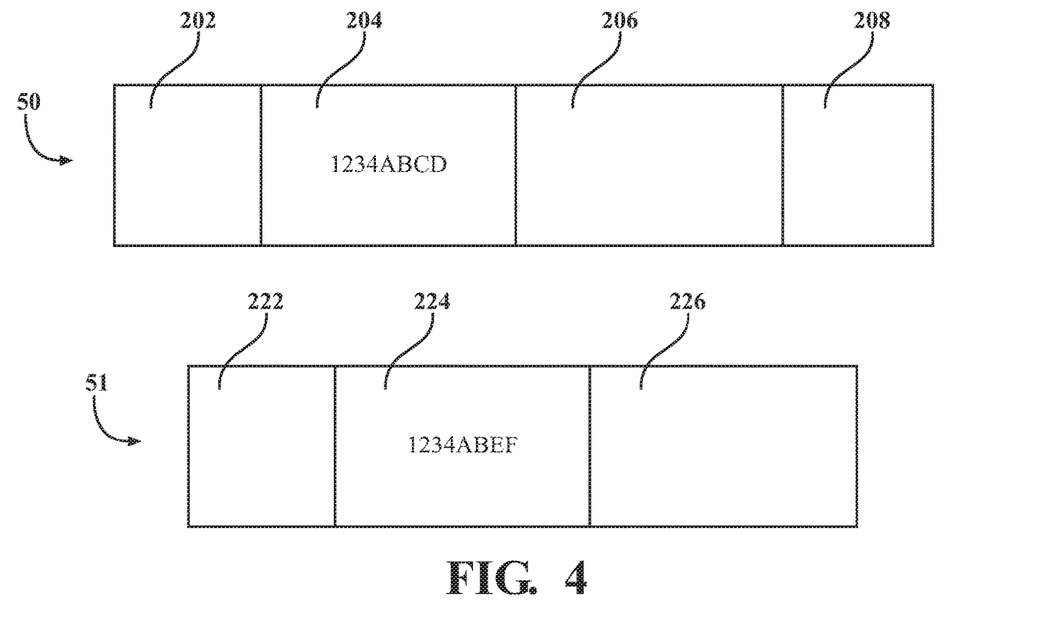

Some communication protocols require that the temporary identifier be changed every so often. In addition, the temporary identifier of one communication protocol may be longer than a temporary identifier of another communication protocol. Referring now to FIG. 4, the first message 50 and the second message 51 are shown. The first message 50 and the second message 51 are examples of two separate messages transferred from one entity to another using different communication protocols. In this case, the communication protocol sending the second message 51 requires that the temporary identifier 224 be changed. In order to maintain some relationship between the temporary identifiers 204 and 224, only a portion of the temporary identifier 224 of the second message 51 was changed. As such, the roadside unit 30 may be able to determine that there is a relationship between the temporary identifiers 204 and 224 and therefore discard one of the messages 50 or 51 and process the other.

Figure 5:
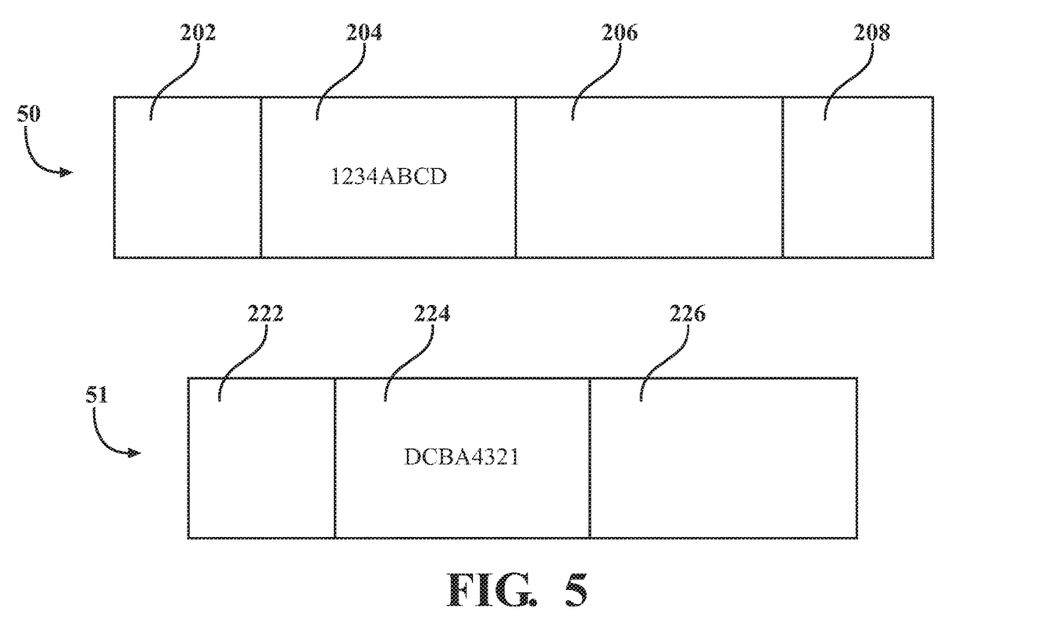

FIG. 5 illustrates another example of different ways of changing the temporary identifiers of the messages 50 and 51 but maintaining some sort of relationship such that the receiving unit can determine that there is a relationship and discard one of the messages as a duplicate. For example, in FIG. 5, the temporary identifier 224 of the second message is essentially reversed from the temporary identifier 204 of the first message 50. The receiving unit may be able to determine this relationship and therefore discard one of the messages as being a duplicate.

Again, the variations illustrated of the temporary identifiers of FIGS. 3-5 are to illustrate that the temporary identifiers of the messages may be the same, may include a portion of one or the other, or may have some mathematical relationship, such as bit reversal and the like.

Figure 6:
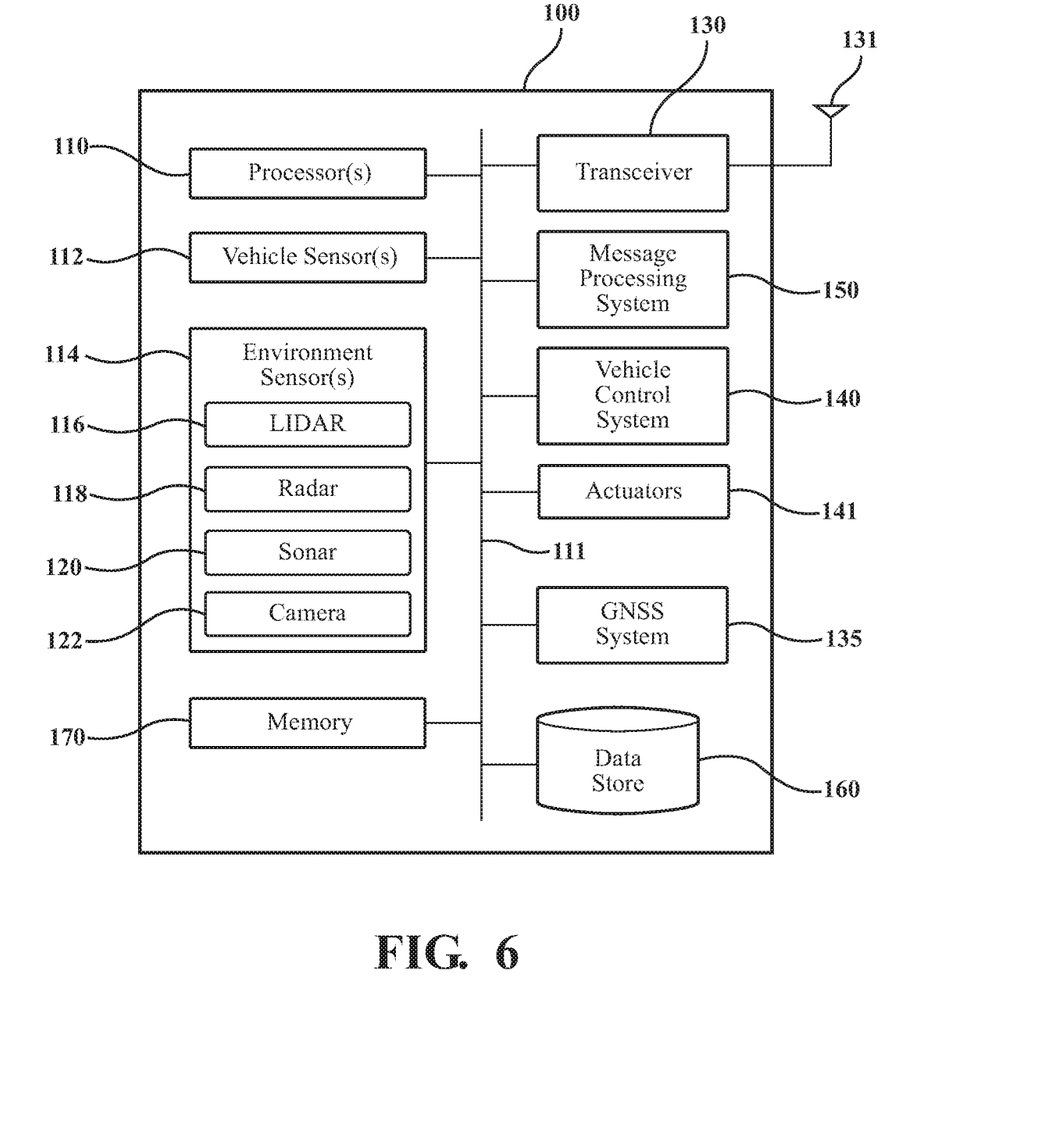
FIG. 6 illustrates a vehicle incorporating the system for processing messages.

Referring to FIG. 6, an example of the vehicle 100 of FIG. 1 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport that, for example, transports occupants, and thus benefits the functionality discussed herein. Additionally, the vehicle 100 could be an autonomous vehicle, a semi-autonomous vehicle, a nonautonomous vehicle, or combinations thereof.

The vehicle 100 also includes various elements. It will be understood that in various embodiments, the vehicle 100 may not have all the elements shown in FIG. 6. The vehicle 100 can have different combinations of the various elements shown in FIG. 6. Further, the vehicle 100 can have additional elements to those shown in FIG. 6. In some arrangements, the vehicle 100 may be implemented without one or more of the elements shown in FIG. 6. While the various elements are shown as being located within the vehicle 100 in FIG. 6, it will be understood that one or more of these elements can be located external to the vehicle 100. Further, the elements shown may be physically separated by large distances and provided as remote services (e.g., cloud-computing services).

In any case, the vehicle 100 may include one or more processor(s) 110. The processor(s) 110 may be located within the vehicle 100 or may be located external to the vehicle 100 and may assist and/or perform the processing of any of the methods disclosed in this specification. The processor(s) 110 may be connected to one or more data buses 111 that allow the processor(s) 110 to communicate with one or more vehicle systems. For example, the processor(s) 110 may have the ability to communicate with one or more vehicle sensors, such as vehicle sensors 112, that may include several different sensors for measuring any one of several different variables. For example, the vehicle sensors 112 can include sensors regarding acceleration, steering wheel angle, velocity, and other forces acting on, or generated by, the vehicle 100.

The vehicle 100 may also include several environment sensors 114. The environment sensors 114 are capable of detecting objects or perform other measurements of the environment that surrounds the vehicle 100. For example, the environment sensors 114 could include light detection and ranging (LIDAR) sensors 116, radar sensors 118, sonar sensors 120, and one or more cameras 122. The purpose of the sensors making up the environment sensors 114 is to detect objects external to the vehicle 100. The vehicle 100 may also include a global navigation satellite system (GNSS) 135 that can receive signals from satellites and determine the approximate location of the vehicle 100. Anyone of several different GNSS systems may be utilized, such as Global Positioning System (GPS), Galileo, GLONASS, Beidou, and the like.

The vehicle 100 may also include a transceiver 130 that can send and/or receive messages from external devices, such as other vehicles, infrastructure, roadside units, and the like. The transceiver 130 may have an antenna 131 that allows for the reception and transmission of messages. In this example, the transceiver 130 performs both sending and receiving messages, but the transceiver 130 may be broken down into separate receivers and/or transmitters that can receive and/or transmit messages. Furthermore, the transceiver 130 may be able to receive and/or transmit messages via different communication protocols. These communication protocols could include Dedicated Short-Range Communication (DSRC), Cellular vehicle-to-everything (C-V2X), Wi-Fi, and Bluetooth. Other types of communication protocols could also be utilized.

The vehicle 100 may also include a vehicle control system 140 that may be able to control one or more actuators 141 of the vehicle 100. As such, the vehicle control system 140 may control the movement of the vehicle 100 by controlling actuators 141 that control the movement of the vehicle. Further, the vehicle control system 140 may also be able to receive information from the vehicle sensors 112 and/or the environment sensors 114 to determine how the vehicle control system 140 should pilot the vehicle 100. As such, the vehicle control system 140 could be a semi-autonomous and/or autonomous control system that is able to pilot the vehicle with the assistance of a human operator or, in the case of an autonomous system, can pilot the vehicle 100 with little to no human input.

Figure 7:
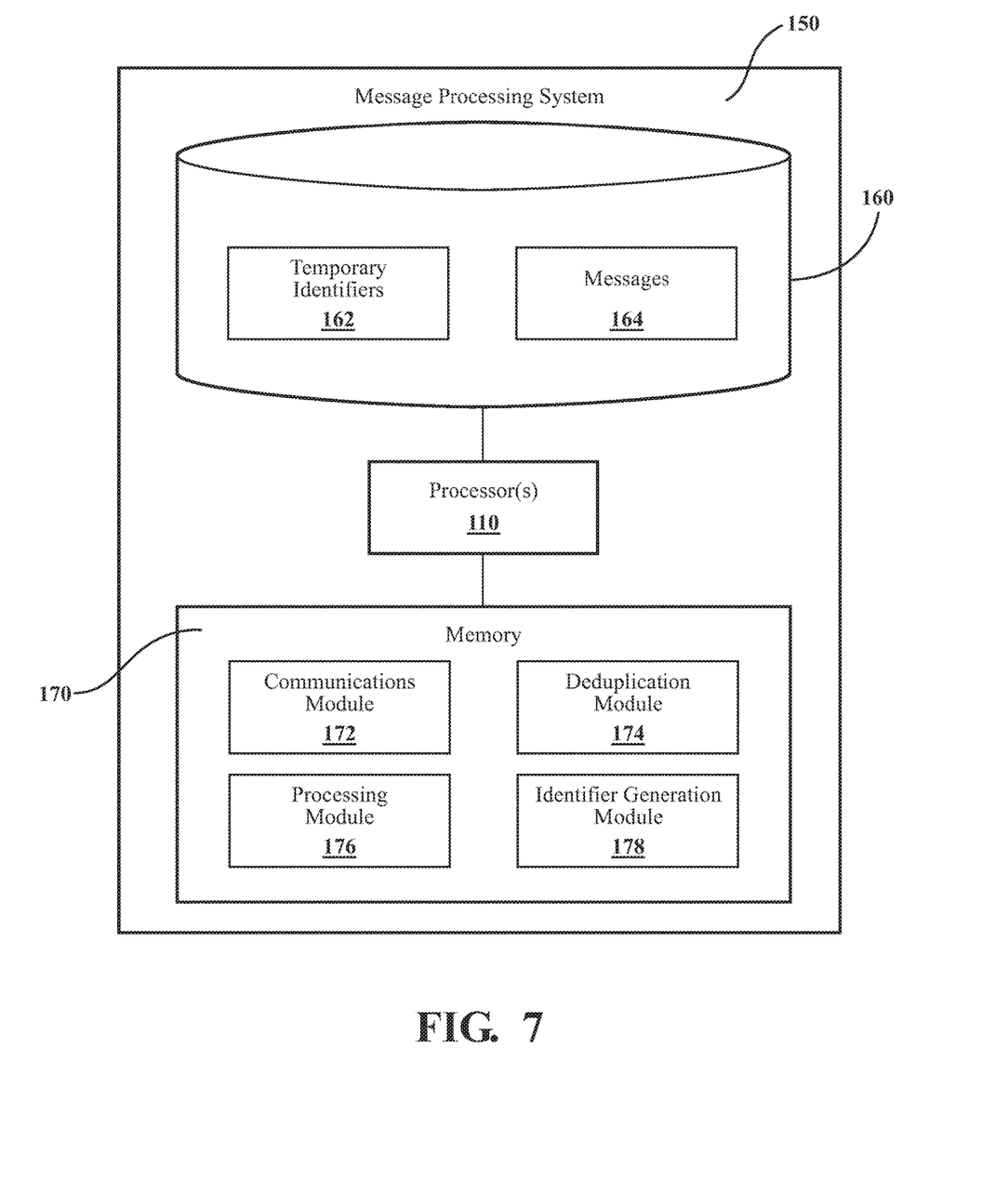
FIG. 7 illustrates a more detailed view of the system for processing messages.

The vehicle 100 also includes the message processing system 150, as mentioned previously. With reference to FIG. 7, a more detailed illustration of the message processing system 150 is shown. As shown, the message processing system 150 includes a processor(s) 110. Accordingly, the processor(s) 110 may be a part of a message processing system 150, or message processing system 150 may access the processor(s) 110 through the data buses 111 or another communication pathway. In one or more embodiments, the processor(s) 110 is an application-specific integrated circuit that is configured to implement functions associated with a communications module 172, a deduplication module 174, a processing module 176, and an identifier generation module 178. More generally, in one or more aspects, the processor(s) 110 is an electronic processor, such as a microprocessor that can perform various functions as described herein when loading the modules 172-178 and executing encoded functions associated therewith.

In this example, the message processing system 150 is disposed within the vehicle 100. However, the message processing system may be disposed of in other devices that can transmit and/or receive messages. For example, the message processing system 150 may be disposed within the other vehicles 20, 22, traffic light 42, the building 32, and/or the roadside unit 30. These are just examples, and that the message processing system 150 may be disposed of in a variety of different applications that involve the transmitting and/or receiving of messages, not just those mentioned in this specification In one embodiment, the message processing system 150 includes a memory 170 that stores the communications module 172, the deduplication module 174, the processing module 176, and/or the identifier generation module 178. The memory 170 may be a random-access memory (RAM), read-only memory (ROM), a hard disk drive, a flash memory, or other suitable memory for storing the modules 172-178. The modules 172-178 are, for example, computer-readable instructions that, when executed by the processor(s) 110, cause the processor(s) 110 to perform the various functions disclosed herein. While, in one or more embodiments, the modules 172-178 are instructions embodied in the memory 170, in further aspects, the modules 172-178 include hardware, such as processing components (e.g., controllers), circuits, etc. for independently performing one or more of the noted functions.

Furthermore, in one embodiment, the message processing system 150 includes a data store 160. The data store 160 is, in one embodiment, an electronically based data structure for storing information. In at least one approach, the data store 160 is a database that is stored in the memory 170 or another suitable medium, and that is configured with routines that can be executed by the processor(s) 110 for analyzing stored data, providing stored data, organizing stored data, and so on. In either case, in one embodiment, the data store 160 stores data used by the modules 172-178 in executing various functions. In one embodiment, the data store 160 may be able to store temporary identifiers 162 and/or messages 164. As explained previously, the temporary identifiers 162 could be associated with the temporary identifiers of one or more messages 164.

The communications module 172 may include instructions that, when executed by the processor(s) 110, cause the processor(s) 110 to receive a first incoming message via a first transmission protocol having a first incoming temporary identifier value and receive a second incoming message via a second transmission protocol having a second incoming temporary identifier value. This may be accomplished by receiving the messages via the one or more antennas 131 of the transceiver 130. In this example, the first message and the second message may be similar to the first message 50 and the second message 51 of FIG. 3, respectively. Here, the payload portions 206 and 226 of the first and second messages 50 and 51, respectively, are the same or contain the same intended message. However, as stated previously, the first message 50 and the second message 51 were transmitted using different communication protocols. In one example, the first message 50 could be transferred using a DSRC type communication protocol, while the second message 51 may be communicated using a C-V2X type protocol. These messages may be stored in the data store 160 as messages 164. The temporary identifiers associated with the messages may be stored as the temporary identifiers 162 in the data store 160.

The deduplication module 174 may include instructions that, when executed by the processor(s) 110, cause the processor(s) 110 to compare the first incoming temporary identifier value to the second incoming temporary identifier value to determine when the first incoming temporary identifier value is related to the second incoming temporary identifier value. More simply, the deduplication module 174 causes the processor(s) 110 to determine if there is some relationship between the first incoming temporary identifier value and the second incoming temporary identifier value.

In one example, as best shown in FIG. 3, the temporary identifiers 204 and 224 may be identical, thus indicating a relationship between the two. However, as best shown in FIG. 4, the temporary identifiers 204 and 224 may not equal each other but may have portions that are equal. Generally, in order to avoid discarding messages that are not related to each other, usually a longer portion of data, such as one byte or longer, is analyzed in the temporary identifier to see if there is a match. If such a relationship regarding portions is detected, the deduplication module 174 may determine that the messages are related. Furthermore, other types of relationships may also be utilized, such as message reversal, bit flipping, summation, and the like. For example, referring to FIG. 5, the temporary identifiers 204 and 224 are reversed from each other, thus indicating the potential relationship between the two. Any type of relationship between the temporary identifiers 204 and 224 may be utilized but should generally be consistent and generally known to the receiver.

If a determination has been made that the first incoming temporary identifier value and the second incoming temporary identifier value are related, the deduplication module 174 may cause the processor(s) 110 to discard the second incoming message from the data store 160. The reason for discarding the second incoming message is that because the second incoming message has been determined to be related to and essentially contain the same information in the payload portion of the message. As such, storing and eventually processing both messages is wasteful, as both messages essentially contain the same information but were merely transmitted using different transmission protocols. Once any duplicate messages have been discarded from the data store 160, the processing module 176 may include instructions that cause the processor(s) 110 to process any non-discarded messages.

Returning to the communications module 172, it was previously noted that the message processing system 150 may be found in a receiver, as described in the paragraphs immediately above, or may be found in the form of a transmitter or combination of the two, commonly referred to as a transceiver. In one example, the communications module 172 may include, in addition to what was described above regarding receiving messages, or as an alternative, instructions that cause the processor(s) 110 to transmit a first outgoing message via the first transmission protocol having a first outgoing temporary identifier value, and transmit a second outgoing message via the second transmission protocol having a second outgoing temporary identifier value.

Both the first and the second outgoing temporary identifier values are based on the random identifier value. The random identifier value may be generated by the processor(s) 110 by executing instructions found in the identifier generation module 178. The identifier generation module 178 generates a random temporary identifier value that can be used to form the basis for the temporary identifiers of the outgoing messages Like before, the temporary identifiers of the outgoing messages may be equal or may have some relationship, where a portion (such as one byte or more) of the temporary identifiers are equal to each other. Furthermore, other relationships may be present as well, such as reversing the bits that make the temporary identifiers or some other type of mathematical relationship.

There may be some instances where one or more communication protocols require that a temporary identifier be changed every so often to protect the privacy of the entity that is sending a message. If such a case arises, the communications module 172 may modify one or more of the temporary identifiers to generate a new temporary identifier. However, the modification of the new temporary identifier still maintains some indication of the relationship with the original temporary identifier. For example, the communications module 172 may transmit the first outgoing message and the second outgoing message having temporary identifiers that are equal, such as shown in FIG. 3, where the temporary identifiers 204 and 224 are equal. However, if the communication protocol requirements of one of the messages require that a temporary identifier be changed every so often, the communication module could only change a portion of the temporary identifier, such as shown in FIG. 4, where the temporary identifier 224 of the message 51, represented in hexadecimal code, is changed from "1234ABCD" to "1234ABEF." In this example, the temporary identifier is four bytes long. However, in this example, only the last byte (the portion that contains the "CD") was changed to "EF." Assuming the receiving module is aware that such changes could occur, the receiving module may only compare the first three bytes of the temporary identifier to see if there is a match and will ignore the last byte knowing that the last byte may change so as to comply with one or more transmission protocols and/or provide some sense of privacy to the transmitting entity.

Other types of protocols could also be utilized. For example, as shown in FIG. 5, the temporary identifier 224 may be changed from "1234ABCD" to "DCBA4321," essentially reversing the order of the bytes forming the temporary identifier. Assuming the receiving modules are aware of such changes, the receiving module can look for temporary identifiers that, while not being equal, may be reversed or have some mathematical relationship.

As such, when transmitting entity transmits messages using different transmission protocols, the message processing system 150 has the ability to transmit a temporary identifier along with the message to inform any receivers of the relationship between two messages that were sent by two different transmission protocols. If the relationship between the two messages indicates that the two messages essentially contain the same payload data and do not need to both be processed, the receiver can then discard any duplicate messages to reduce the computational load.

In addition, the message processing system 150 can change the temporary identifiers in such a way that the receiving entity can still determine the relationship of the messages, even though the temporary identifier may have been changed. This is accomplished, as explained earlier, by either changing only a portion of the temporary identifier or performing some mathematical function, such as bit reversal, and the like to cause a change in the temporary identifier but a change that can be detected by the receiver so as still be able to allow the receiver to determine the relationship between a first message and second message.

Figure 8:
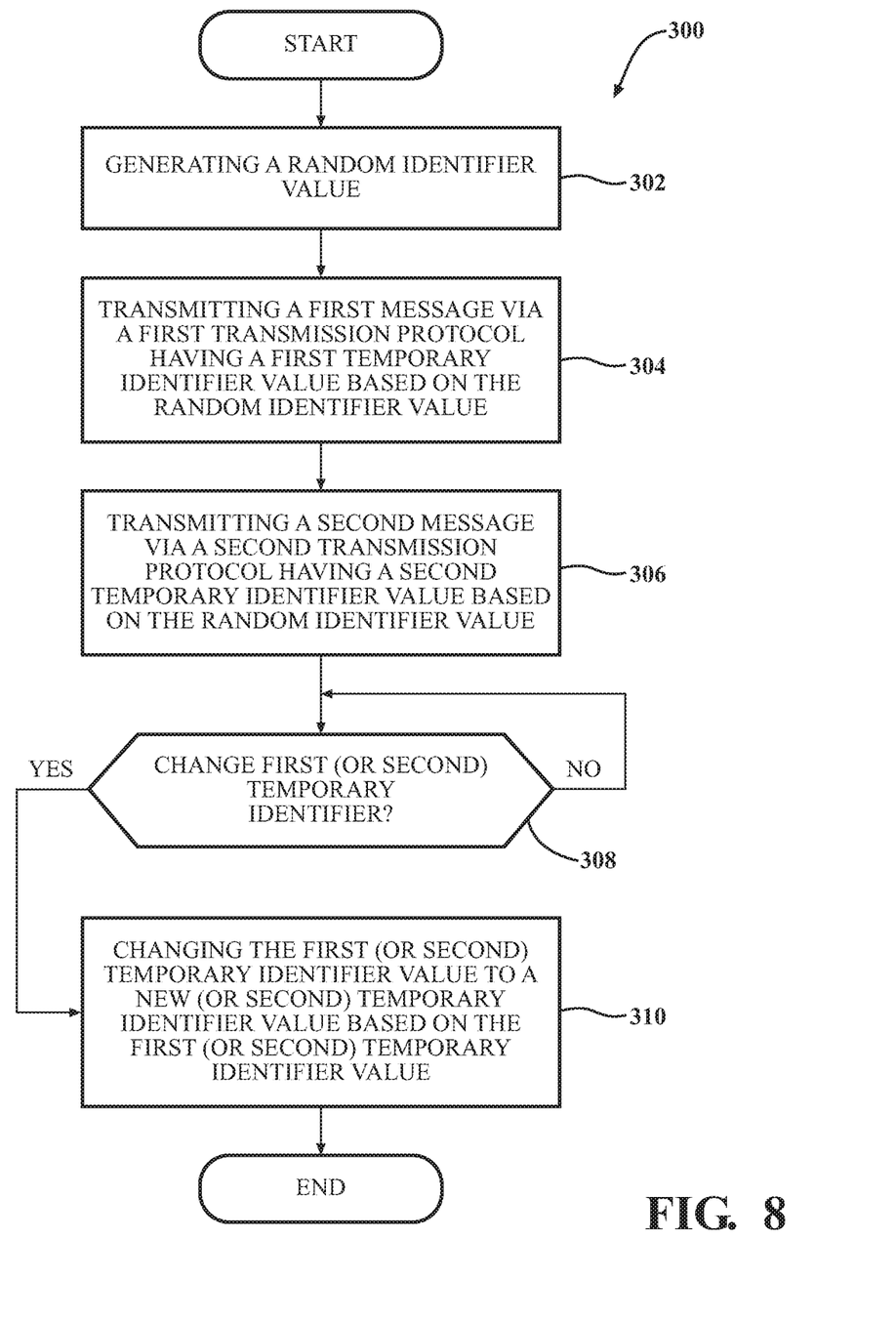
FIG. 8 illustrates a method for transmitting a message using different communication protocols.

Referring to FIG. 8, a method 300 for transmitting messages is shown. The method 300 will be explained from the perspective of the message processing system 150 of the vehicle 100. However, the method 300 could be performed at any one of several different devices and is not merely limited to the message processing system 150 of the vehicle 100. Furthermore, the device performing the method 300 does not need to be incorporated within a vehicle and could be incorporated within other devices as well, such as roadside units, infrastructure, mobile devices, and the like.

In step 302, the identifier generation module 178 causes the processor(s) 110 to generate a random identifier value. The random identifier value can be of any length but is generally more than one byte in length. In step 304, the message processing system 150 transmits a first message via a first transmission protocol. The transmission of the first message may be performed by the communication module 172 that causes the transceiver 130 of the vehicle 100 to transmit the message via the antenna 131. The transmission protocol could be any one of several different transmission protocols, such as DSRC, C-V2X, Wi-Fi, Bluetooth, and the like. Embedded within the first message is a temporary identifier value that is based on the random identifier value generated by the identifier generation module 178.

Similarly, in step 306, the communication module 172 transmits a second message by causing the transceiver 130 of the vehicle to transmit the message via the antenna 131. Like before, the second message is transmitted using a communication protocol. Any one of several different transmission protocols may be utilized, such as DSRC, C-V2X, Wi-Fi, Bluetooth, and the like. For exemplary purposes, the transmission protocol utilized by the first message and the transmission protocol utilized by the second message are different. Also, like before, embedded within the second message is also a temporary identifier that is based on the random identifier value generated by the identifier generation module 178. The first and second temporary identifier values may be equal values or may have some relationship to the random identifier value. For example, the first temporary identifier value could be a value that is reversed in the second temporary identifier value.

Depending on the requirements of the system and/or the requirements of one or more transmission protocols, the method 300 may need to determine if one of the temporary identifiers should be changed, as indicated in step 308. If no such change is requested or required, the method 300 waits until such a request is made or required. If it is time to change the temporary identifier value, the method proceeds to step 310, where the first or second temporary identifier value is changed to a new temporary identifier value. This new temporary identifier value may be based on the first or secondary temporary identifier value and/or the value generated by the identifier generation module 178.

Figure 9:
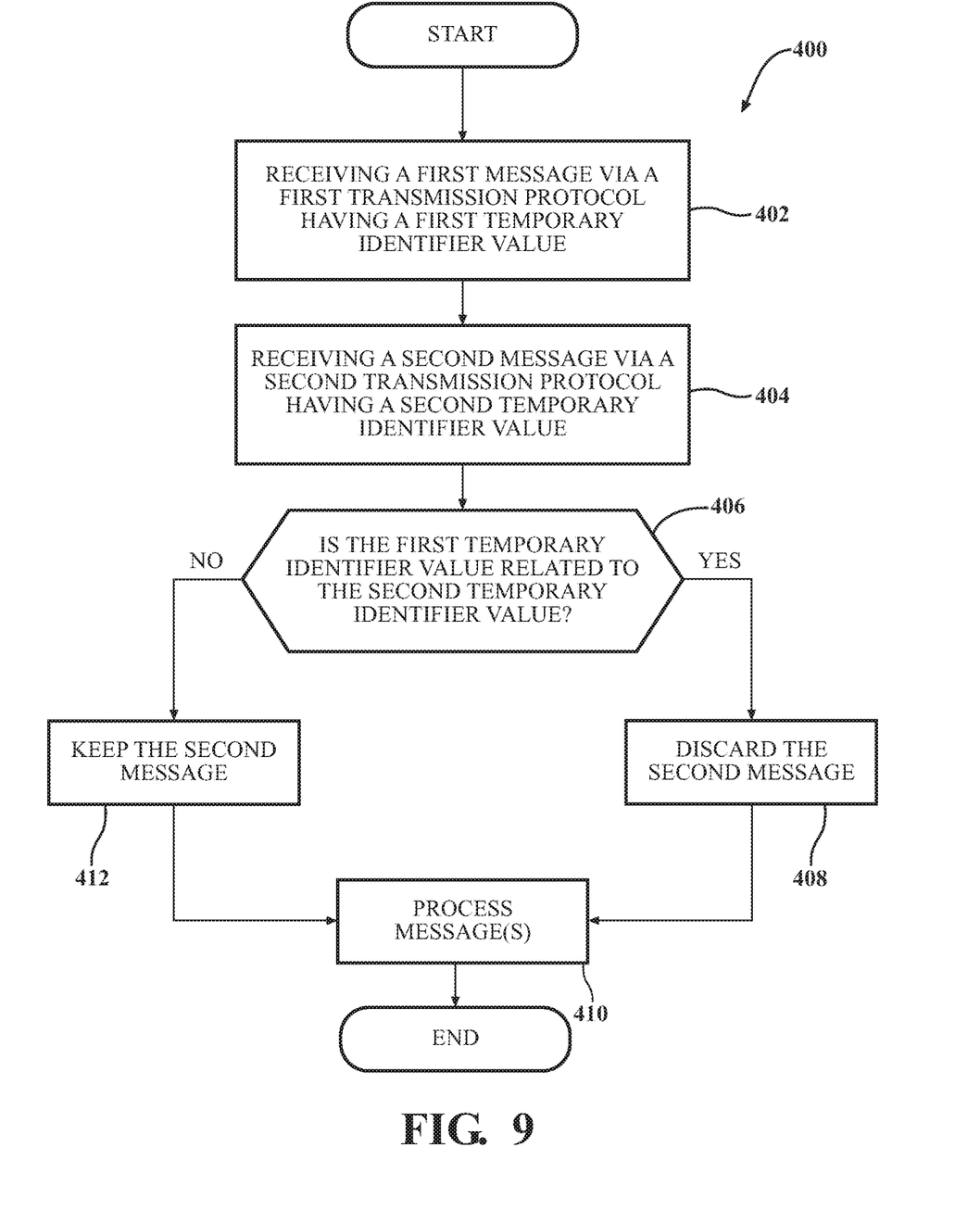
FIG. 9 illustrates a method for receiving messages having different communication protocols and discarding duplicate messages to improve computational performance.

Referring to FIG. 9, a method 400 for receiving messages is shown. The method 400 will be explained from the perspective of the message processing system 150 of the vehicle 100. However, the method 400 could be performed at any one of several different devices and is not merely limited to the message processing system 150 of the vehicle 100. Furthermore, the device performing the method 400 does not need to be incorporated within a vehicle and could be incorporated within other devices as well, such as roadside units, infrastructure, mobile devices, and the like.

The method 400 begins at step 402, where the communications module 172 causes the processor(s) 110 to receive the first message via a first transmission protocol. The first message having the first transmission protocol may be like the first message 50 of FIG. 3. As such, the first message 50 may have a preamble 202 postamble 208, a payload portion 206, and a temporary identifiers 204.

In step 404, the communications module 172 causes the processor(s) 110 to receive a second message via a second transmission protocol. The second message may be like the second message 51 of FIG. 3. The second message 51 may have a payload portion 226 that may contain the same data as the payload portion 206 of the first message 50. In addition, the second message 51 may also have a temporary identifier 224 embedded within the second message 51.

It should be first noted that, as explained before, the first temporary identifier value and the second temporary identifier value may be related to each other. As such, the first temporary identifier value and the second temporary identifier value may be equal values, such as shown in FIG. 3 or otherwise related. For example, referring to FIG. 4, the temporary identifier 204 of the first message 50 matches a portion of the temporary identifier 224 of the second message 51.

In step 406, the deduplication module 174 causes the processor(s) 110 to determine if the first temporary identifier value is related to the second temporary identifier value. For example, regarding FIG. 3, the processor(s) 110 may determine that the temporary identifiers 204 and 224 are equal. Referring to FIG. 4, the processor(s) 110 may determine that there is a relationship between the temporary identifiers 204 and 224 by observing that only a portion of the temporary identifier is different. Further still, referring to FIG. 5, the processor(s) 110 may be able to determine some other relationship between the identifiers. For example, in this figure, the temporary identifier 224 of the second message 51 is reversed from the temporary identifier 204 of the first message 50.

If there is a relationship between the temporary identifier values, the method 400 proceeds to step 408, where one of the messages is discarded. The reason why one of the messages can be discarded is that because both messages share some relationship between their temporary identifier values, the system may determine that both messages essentially contain the same information in the payload portions 206 and 226 of the messages 50 and 51, respectively. If such a situation arises, the processor(s) 110 does not need to carry the additional burden of processing both messages, as both messages contain the same data. As such, the deduplication module 174 causes the processor(s) 110 to discard one of the messages. However, if the messages are not related, both messages will be kept, as indicated in step 412.

Thereafter, as indicated in step 410, the processing module 176 causes the processor(s) 110 to process any remaining messages. As such, if there is no relationship between the temporary identifier values of the first and second messages, the processing module 176 will have the processor(s) 110 process both messages. However, if there is a relationship between the messages, one of the messages will be discarded, thereby freeing up additional processing capabilities as the processor(s) 110 will not be burdened with processing a duplicate message.

The systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic media, an ASIC, a graphics processing unit (GPU), a CD, other optical media, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. The module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for processing messages comprising:
one or more processors; and
a memory in communication with the one or more processors, the memory comprising:
a communications module having instructions that when executed by the one or more processors cause the one or more processors to receive a first incoming message via a first transmission protocol having a first incoming temporary identifier value and receive a second incoming message via a second transmission protocol having a second incoming temporary identifier value, wherein the first incoming temporary identifier value identifies information within the first incoming message and the second incoming temporary identifier value identifies information within the second incoming message,
a deduplication module having instructions that when executed by the one or more processors cause the one or more processors to compare the first incoming temporary identifier value to the second incoming temporary identifier value to determine when the first incoming temporary identifier value is related to the second incoming temporary identifier value and discard the second incoming message when the first incoming temporary identifier value is related to the second incoming temporary identifier value,
a message processing module having instructions that when executed by the one or more processors cause the one or more processors to process the first incoming message,
the communications module further comprises instructions that when executed by the one or more processors cause the one or more processors to receive the first incoming message having a new first incoming temporary identifier value, wherein the new first incoming temporary identifier value is based on the first incoming temporary identifier value and does not equal the first incoming temporary identifier value, and
the deduplication module further comprises instructions that when executed by the one or more processors cause the one or more processors to compare the new first incoming temporary identifier value to the second incoming temporary identifier value to determine when the new first incoming temporary identifier value is related to the second incoming temporary identifier value and discard the second incoming message when the new first incoming temporary identifier value is related to the second incoming temporary identifier value.

2. The system of claim 1, wherein the first incoming temporary identifier value is at least one of: equal to the second incoming temporary identifier value and has a portion that is equal to the second incoming temporary identifier value, wherein the portion is at least one byte.

3. The system of claim 1, wherein the new first incoming temporary identifier value has a portion that is equal to the second incoming temporary identifier value.

4. The system of claim 1, wherein the first incoming message and the second incoming message are vehicle-to-everything (V2X) messages transmitted from at least one of a vehicle, a roadside unit, and an infrastructure.

5. The system of claim 1, wherein:
the first transmission protocol includes at least one of Dedicated Short-Range Communication (DSRC), Cellular V2X (C-V2X), Wi-Fi, and Bluetooth;
the second transmission protocol includes at least one of Dedicated Short-Range Communication (DSRC), Cellular V2X (C-V2X), Wi-Fi, and Bluetooth; and
wherein the first transmission protocol does not equal the second transmission protocol.

6. The system of claim 1, wherein:
the memory further comprises an identifier generating module having instructions that when executed by the one or more processors cause the one or more processors to generate a random identifier value, and
the communications module further comprising instructions that when executed by the one or more processors cause the one or more processors to transmit a first outgoing message via the first transmission protocol having a first outgoing temporary identifier value, the first outgoing temporary identifier value being based on the random identifier value and transmit a second outgoing message via the second transmission protocol having a second outgoing temporary identifier value, the second outgoing temporary identifier value being based on the random identifier value.

7. The system of claim 6, wherein the first outgoing temporary identifier value is at least one of: equal to the second outgoing temporary identifier value and has a portion that is equal to the second outgoing temporary identifier value, wherein the portion is at least one byte.

8. The system of claim 6, wherein the communications module further comprises instructions that when executed by the one or more processors cause the one or more processors to change the first outgoing temporary identifier value to a new first outgoing temporary identifier value, wherein the new first outgoing temporary identifier value is based on the first outgoing temporary identifier value and does not equal the first outgoing temporary identifier value.

9. A method for receiving messages, the method comprising the steps of:
  receiving a first message via a first transmission protocol having a first temporary identifier value, wherein the first temporary identifier value identifies information within the first message;
  receiving a second message via a second transmission protocol having a second temporary identifier value, wherein the second temporary identifier value identifies information within the second message;
  comparing the first temporary identifier value to the second temporary identifier value to determine if the first temporary identifier value is related to the second temporary identifier value;
  discarding the second message when the first temporary identifier value is related to the second temporary identifier value;
  receiving the first message having a new first temporary identifier value, wherein the new first temporary identifier value is based on the first temporary identifier value and does not equal the first temporary identifier value;
  comparing the first new temporary identifier value to the second temporary identifier value to determine if the new first temporary identifier value is related to the second temporary identifier value;
  discarding the second message when the new first temporary identifier value is related to the second temporary identifier value; and
  processing the first message.

10. The method of claim 9, wherein the first temporary identifier value is at least one of: equal to the second temporary identifier value and has a portion that is equal to the second temporary identifier value, wherein the portion is at least one byte.

11. The method of claim 9, wherein the new first temporary identifier value has a portion that is equal to the second temporary identifier value.

12. The method of claim 9, wherein the first message and the second message are vehicle-to-everything (V2X) messages transmitted from at least one of a vehicle, a roadside unit, and an infrastructure.

13. The method of claim 9, wherein:
  the first transmission protocol includes at least one of Dedicated Short-Range Communication (DSRC), Cellular V2X (C-V2X), Wi-Fi, and Bluetooth;
  the second transmission protocol includes at least one of Dedicated Short-Range Communication (DSRC), Cellular V2X (C-V2X), Wi-Fi, and Bluetooth; and
  wherein the first transmission protocol does not equal the second transmission protocol.

14. A method for transmitting messages, the method comprising the steps of:
  generating a random identifier value;
  transmitting a first message via a first transmission protocol having a first temporary identifier value, the first temporary identifier value being based on the random identifier value, wherein the first temporary identifier value identifies information within the first message;
  transmitting a second message via a second transmission protocol having a second temporary identifier value, the second temporary identifier value being based on the random identifier value, wherein the second temporary identifier value identifies information within the second message, and
  changing the first temporary identifier value to a new first temporary identifier value, wherein the new first temporary identifier value is based on the first temporary identifier value and does not equal the first temporary identifier value.

15. The method of claim 14, wherein the first temporary identifier value is at least one of: equal to the second temporary identifier value and has a portion that is equal to the second temporary identifier value, wherein the portion is at least one byte.

16. The method of claim 14, wherein the first message and the second message are vehicle-to-everything (V2X) messages transmitted from at least one of a vehicle, a roadside unit, and an infrastructure.

17. The method of claim 14, wherein:
  the first transmission protocol includes at least one of:
  Dedicated Short Range Communication (DSRC), Cellular V2X (C-V2X), Wi-Fi, and Bluetooth;
  the second transmission protocol includes at least one of Dedicated Short-Range Communication (DSRC), Cellular V2X (C-V2X), Wi-Fi, and Bluetooth; and
  wherein the first transmission protocol does not equal the second transmission protocol.

\* \* \* \* \*